United States Patent

[11] 3,613,540

[72] Inventor Makoto Nakamura
 Urawa-shi, Japan
[21] Appl. No. 864,500
[22] Filed Oct. 7, 1969
[45] Patented Oct. 19, 1971
[73] Assignee Nippon Kogaku K. K.
 Tokyo, Japan
[32] Priority Oct. 14, 1968
[33] Japan
[31] 43/89545

[54] FILM COUNTER CHANGEOVER DEVICE FOR DIFFERENT KINDS OF FILM HAVING DIFFERENT FRAMES
4 Claims, 14 Drawing Figs.
[52] U.S. Cl. ..................................................... 95/31 DS, 95/31 R
[51] Int. Cl. ..................................................... G03b 1/14, G03b 1/62, G03b 1/66

[50] Field of Search ............................................. 95/31 R, 31 DS, 31 FL

[56] References Cited
UNITED STATES PATENTS
| | | | |
|---|---|---|---|
| 3,426,665 | 2/1969 | Maeda | 95/31 |
| 2,926,424 | 3/1960 | Weiss | 95/31 X |
| 2,967,471 | 1/1961 | Sommermeyer | 95/31 |
| 3,073,229 | 1/1963 | Madge | 95/31 DS |

Primary Examiner—Samuel S. Matthews
Assistant Examiner—Russell E. Adams, Jr.
Attorney—Ward, McElhannon, Brooks & Fitzpatrick ABSTRACT: A frame counter changeover and film-metering device is interconnected with a film guide changeover device to enable a camera to operate with different lengths and thickness of film. The film guide changeover device consists of two slidable pressure plates. Upon operation of an external control, the gap between the two plates is varied to accommodate different film thicknesses. The external control also adjusts the frame counter to accommodate different lengths of film.

FILM COUNTER CHANGEOVER DEVICE FOR DIFFERENT KINDS OF FILM HAVING DIFFERENT FRAMES

This invention provides a frame counter changeover device which can be used for different kinds of film having different frames.

In conventional roll film cameras designed to use both types of roll films, i.e., film with and without paper backing, of different thickness and number of frames (film length), the device for varying the gap of the film pressure plate back and forth in order to change the gap of the tunnel through which the film passes, and the frame counter changeover device are provided separately. This results in a complicated operation and an erroneous combination of operations, for example, switching the film pressure plate to the film side with paper backing and setting the frame counter to the film side without paper backing.

The principal object of this invention is to offer a frame counter changeover device interlocked with the film guide changeover device for different kinds of film with different numbers of frames which do not have the above-mentioned defects.

IN accordance with this invention, the frame counter changeover device and the film guide changeover device are interlocked with each other in such a manner that the film or frame counter is switched to the frame number adequate to the film used in interlocking with the sliding external operation of the pressure plate from a first position to a second position or vice versa so that the erroneous combination of the film changeover operation and frame counter changeover operation is avoided.

The present invention is described more clearly referring to an illustrative embodiment shown in the drawing, in which:

FIGS. 2A and 2B show perspective views of the metering plate used in the embodiment shown in FIG. 1, in which FIG. 2A shows the state where the lever is engaged while FIG. 2B shows the state where the lever is disengaged therefrom;

FIGS. 3A, 3B, 3C and 3D show plan views of said metering plate, in which, FIG. 3A shows the state where the lever is engaged, FIG. 3B shows the state where the lever is disengaged, FIG. 3C shows the state where the first frame of the film has been advanced and FIG. 3D shows the state where the shutter has been released after the first frame had been advanced;

FIGS. 6A and 6B show cross sections along with VI—VI line in FIG. 5, in which FIG. 6A shows the state where the film pressure plate is set at the position without paper backing, and FIG. 6B shows the state where the film pressure plate is set at the position with paper backing;

FIGS. 7A and 7B show enlarged cross sections taken along VII—VII line of FIG. 5, in which FIG. 7A shows the state where the film pressure plate is set at the position without paper backing and FIG. 7B shows the state where the film pressure plate is set at the position with paper backing.

Figure 3A:
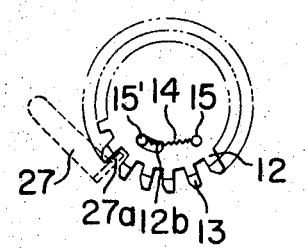
Figure 3B:
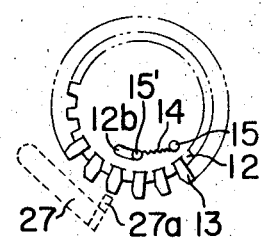

In the drawing, 1 is the camera body; 2 is a winding lever supported by a winding shaft 3, for winding up the shutter mechanism (not indicated) and the film advance mechanism simultaneously. 4 is a ratchet wheel supported by a shaft 5 having a key 5′ at the bottom end. The ratchet wheel 4 is interlocked with the winding lever 2 by way of the gears $a$, $b$, and $c$ of the winding system; 6 is a spool having a key groove 6a engaging with the key 5′ and formed on one end surface. The spool 6 takes up one frame length of the given film when the aforementioned winding lever 2 is wound until the ratchet wheel 4 engages with the ratchet pawl 29; 7 is a friction roller which rotates by the friction produced when the film F is taken up in the direction of an arrow by the spool 6, and transmits this rotation to metering plates 12 and 13 by way of gears, $d$, $e$, $f$, $g$, $h$, and 9 to decide the frame space of the film F; 7a is an auxiliary roller which presses the aforementioned friction roller 7. The gear 9 rotates a film or frame counter gear 10 upon the rotation of the aforementioned friction roller 7, and the gear 10 is supported by a shaft 17 and provided with a cam 11 which is positioned at a place for springing out a signal lever 25 when in the case of paperbacked film, a specified number of film frames A (10 in one example) have been exposed and the lever 2 is wound up, and with a notched portion 10a which is formed in such a position that the gear 9 falls into it and makes an idle run when, in the case of paper-backless film, a specified number of film frames B (20 in one example) have been exposed and the aforementioned lever 2 is wound up. The metering plates 12 and 13 function together to divide out one frame length of film. The plate 12 is supported by the shaft 17 and has a pin 15 on the upper surface and an unnotched portion 12a on which, where a paper-backless film is used, a lever 27 rides simultaneously with the falling of the gear 9 into the notched portion 10a when the specified number of film frames B (20 frames for example) have been exposed and the lever 2 has been wound up, and the lever 27 stays on the unnotched portion 12a during the period a new roll of film is loaded and the leading paper is being wound up. The plate 12 has also a groove 12b. The metering plate 13 is provided with a rod 15′ planted on the upper surface thereof which is movable within the groove 12b of the plate 12. The plate 13 rotatably supported by the shaft 17 has an unnotched portion 13a at a position corresponding to the unnotched portion 12a and the plate 13 is normally biased to rotate in a counterclockwise direction by a spring 14 spanned between the pin 15 and the rod 15′. FIG. 3A shows the state in which the end portion 27a of the lever 27 is engaged with the teeth of the metering plates 12 and 13 when the film is wound up. When a shutter button 31 is depressed, it presses the end portion 27a of the lever 27 so that it is disengaged from the teeth of the metering plates 12 and 13 and the plate 13 is rotated counterclockwise by the spring 14 to a position as shown in FIG. 3B. When the lever 2 is wound up, the metering plate 13 is rotated a little together with the rotation of plate 12 and the end portion 27a falls into a tooth of plate 13 to stop the rotation thereof. Then only plate 12 further rotates so that the corresponding teeth of plates 12 and 13 are matched to receive the end portion 27a therein. Both plates take the positions as shown in FIG. 3A. A frame indicator plate 16 is supported by the shaft 17 so that it will rotate by one frame together with the gear 10 and plate 12. A signal lever 18 is supported by a connecting rod 22 and is always pulled leftward by a spring 19 that exists between the pin (18a) located on one end of the lever 18 and a pin 20 installed on the camera body so as always to engage with the end edge 38a of an upper pressure plate 38; 21 is a restriction pin for the lever 18 installed on the camera body 1. It is so constructed that when the lever 18 is on the left side (position indicated by dotted lines), the lever 18 is stopped by pin 21. An indication lever 23 indicates the symbol 23′ indicating the numbers of exposures the camera can make (for example 10 or 20), and is supported by the connecting rod 22 and is switched to either symbol interlocking with the switching operation of the lever 18. The scale of the frame indicator plate 16 and one symbol 23′ of the lever 23 can be seen from outside of the camera simultaneously through the frame counter window 24; 25 is a signal lever shaft supported rotatably by a pin 26a installed on the upper side of the free end of the intermediate lever 26 supported by the connecting rod 22, and has a pin 25a on the center lower side which releases the engaging the lever 27.

In the case of paperbacked film, the signal lever shaft (25) stays in the locus (position shown by solid lines) of the cam 11 on the frame counter gear 10 and, when, as mentioned above, a specified number of film frames A (10 frames) has been exposed and the winding lever 2 is wound, the lever 25 is pushed out of the locus of the cam 11 by the action of the cam 11, the interlock between the winding up system and the frame counter is interrupted, and the state, in which only the winding up operation can be performed until the entire roll of film F is taken up by spool 6, is brought about.

Figure 5:
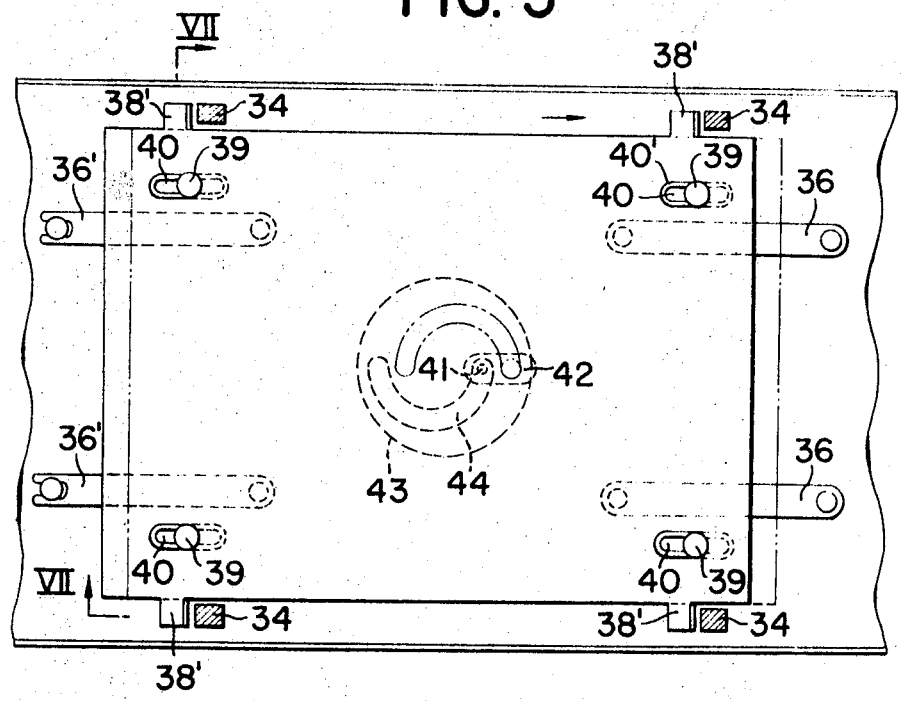
FIG. 5 shows a cross section along with V—V line in FIG. 4.

IN the case of paper-backless film the lever 25 is outside the locus of the aforementioned cam 11 (position shown by dotted line) and, when a specified number 20 of film frames B have been exposed and the winding lever 2 is wound, the engaging lever 27 runs on the unnotched sections 12a and 13a of the metering plates 12 and 13, and, moreover, the notched portion 10a of the frame counter gear 10 comes to the position of the gear 9. Therefore, the gear group belonging to the frame counter rotates idly, and only the winding operation can be performed until the tail end paper of the film is taken up by the spool 6. One end 27a of the lever 27 is bent and the lever 27 is always energized by a spring 28 installed on the other end 27b to rotate counterclockwise. The lever 27 has a ratchet pawl 29 which engages with a ratchet wheel 4 at at the lower end by way of a connecting rod 30; 31 is a shutter button which, when depressed, pushes the end 27a of the engaging lever 27 to release the engagement between it and the metering plates 12 and 13 and simultaneously releases the engagement between the ratchet pawl 29 and the ratchet wheel 4 to enable the winding lever to be wound up a gain. F denotes the film and P the paper back of the film F; 32 is a film window; 33 is an inner rail installed in the camera body; 34 is an outer rail projected from the camera body 1; 35 is a lower pressure plate which is fitted to the back cover 37 by way of plate springs 36 and 36'; 38 is an upper pressure plate which is so connected as to slide on the lower pressure plate 35 by a pin 39 planted on the lower pressure plate 35. The head of the pin 39 engages with the step section 40' of the elliptical groove 40 bored in the plate 38 to enable the plate 38 to slide on the lower pressure plate 35. The depth of the step section 40' is so formed that the head of the pin 39 does not protrude above the surface of the plate 38; 38' is a projection on the upper pressure plate 38 which is pressed to and made to engage with the upper surface of the outer rail 34 by the elasticity of the plate springs 36 and 36'; 41 is an interlocking pin planted on the upper pressure plate 38 and is fitted into the cam groove 44 provided in a cam plate 43 after passing through an elliptical groove 42 provided in the lower pressure plate 35. The cam plate 43 is constructed in one unit with a changeover knob 45, and the shaft section 45' of the knob 45 is fitted into and supported by the step 46 of the back cover 37. On the surface of the knob 45 are provided the number 1 which indicates the paperbacked film and the number 2 which indicates the paper-backless film. These numbers can be selectively indicated by an index mark 37' on the back cover. The outer rail 34, to which the upper pressure plate 38 is pressed and made to contact, projects from four places at the outside of the plate 38 as shown in FIG. 5, and its contacting surface is constructed in two stages 34a and 34b as shown in FIGS. 6 and 7. The surface 34a is formed with a distance between it and the inside rail surface 33 equal to the thickness of the film plus a proper gap, and the surface 34b is formed higher than the face 34a by the thickness of the paper back. The junction of both surfaces 34a and 34b is formed as the slope 34'.

Figure 1:
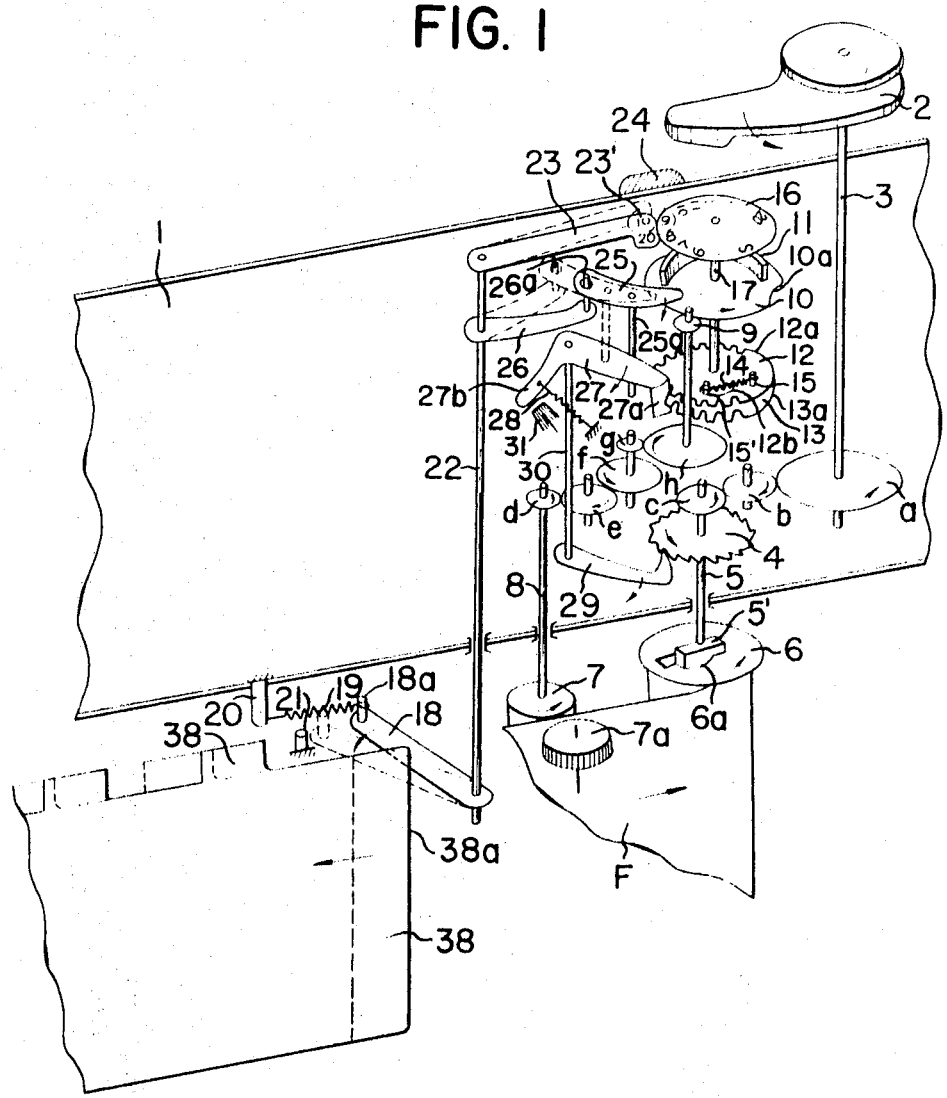
FIG. 1 is a perspective view of an embodiment of this invention.
Figure 2A:
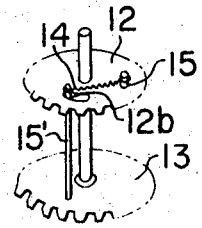
Figure 2B:
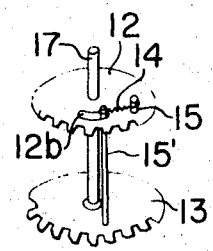
Figure 3C:
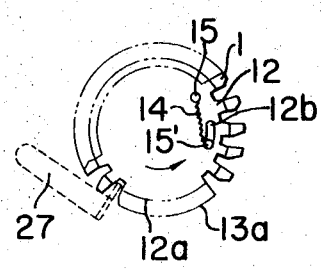
Figure 3D:
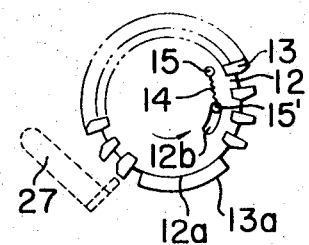
Figure 4:
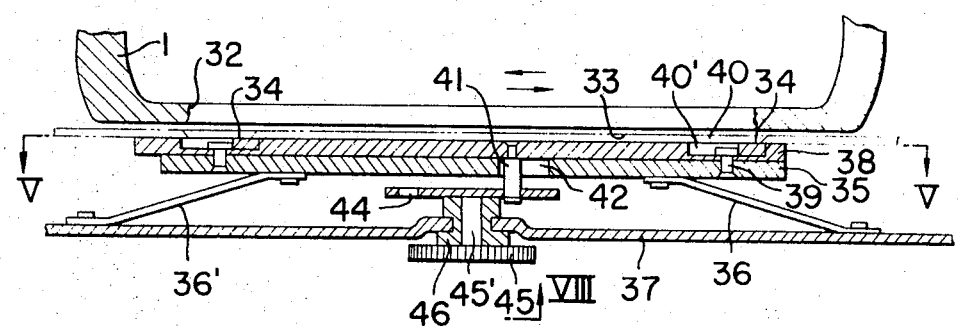
FIG. 4 shows a lateral cross section of the film pressure plate.
Figure 8:
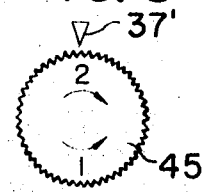
FIG. 8 shows the surface of the changeover knob as viewed from the line VIII.
Figure 6A:
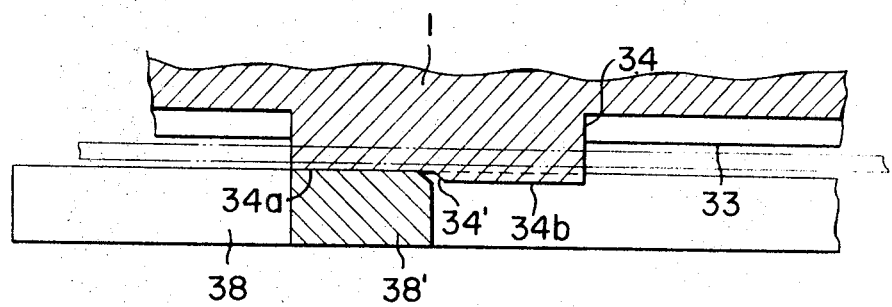
Figure 6B:
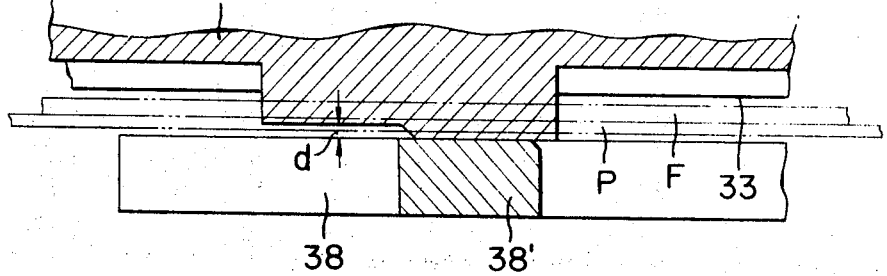
Figure 7B:
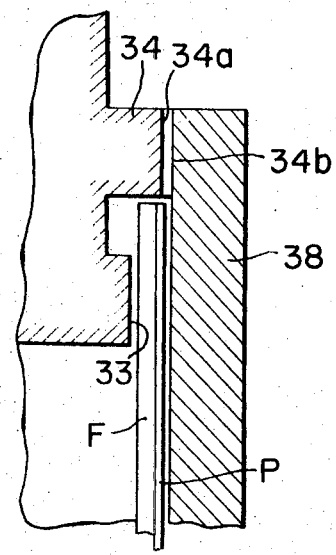
Figure 7A:
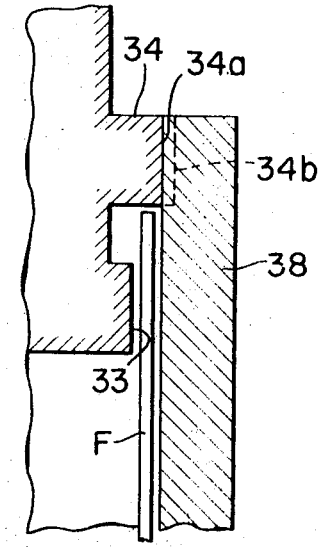

With a construction such as that mentioned above, when, in the case of paper-backless film the film is placed on the inner guide rail 33 and loaded after matching the position S indicating the start position and then the back cover is closed, the upper pressure plate 38 makes contact with the lower step surface 34a of the outer guide rail with a proper pressure by the elasticity of the plate spring 36 as shown in FIGS. 4, 6A and 7A. The cam groove 44 of the cam plate 43 is positioned at the place indicated by the dotted line of FIG. 5, and the interlocking pin 41 fitted into said cam groove 44 is at the position indicated by the solid line. Therefore, the upper pressure plate 38 is displaced to the upper left side of the drawing as indicated by the solid lines of FIG. 5. Moreover, the changeover knob 45 is set that the numeral 2 is indicated by the index mark as shown in FIG. 8. At this point, in FIG. 1, the upper pressure plate 38 is at the position indicated by the dotted line, and the lever 18, interlocking with it, is also at the dotted line position (where the lever is stopped by the pin 21) and engages with the aforementioned upper pressure plate 38. The frame-indicating lever 23 comes also to the dotted line position and indicates the FIG. 20. Both the intermediate lever 6 and the signal lever 25 also at the dotted line positions outside the locus of the cam 11. The gear 9 engages with the frame counter gear 10 slightly on the left side of the notched section 10a, the engaging the lever 27 is on the unnotched sections 12a and 13a of the metering plates 12 and 13, and the engagement between the ratchet pawl 29 which interlocks with the metering plates and the ratchet wheel 4 is released. Therefore, the winding-up operation can be continued by winding the lever 2 until the numeral 1 on the frame-indicating plate 16 becomes visible through the window 24. When the numeral 1 on the indicating plate 16 is visible, the engaging lever 27 engages for the first time with the teeth of the metering plates 12 and 13 shown in FIG. 3C. Next, when the shutter button 31 is depressed, the button pushes the end 27a of the engaging lever 27 to rotate the engaging lever 27 clockwise. This releases the engagement between the metering plates 12, 13 and the aforementioned lever 27 and brings about the state shown in FIG. 3D. Since the engagement between ratchet pawl 29 that interlocks with the said lever 27 and the ratchet wheel 4 is also released, the next winding-Up can be made possible. If, in this way, the exposures are made until the final 20th frame, and then the winding lever is wound, the engaging lever 27 runs on the unnotched portions 12a and 13a of the metering plates and, interlocking with this, the engagement between the ratchet pawl 29 and the ratchet wheel 4 is also released. At the same time, the notched portion 10a of the frame counter gear 10 comes to the position of the gear a and runs idly when the winding motion proceeds. This means that only the film is taken up by winding the lever 2 because the group of gears of the frame counter system run idly, and that the film can be taken up by the spool 6 to the end. In the case of film with paper backing, the film is loaded in the same manner as the film without paper backing and the changeover knob 45 is rotated clockwise until the numeral 1 matches with the index mark 37', the cam plate 43 is formed into one unit with the knob 45 rotates 180°, cam groove 44 is positioned as shown by the alternate long and two short dashes line in FIG. 5, and the interlocking pin 41 moves to the right side. Consequently, by the movement of said interlocking pin 41, the upper pressure plate 38 slides on the lower pressure plate 35 to move the the right side as shown by the alternate long and two short dash lines. Therefore, the projection 38' of the plate 38 presses and makes contact with upper step surface 34b of the outer guide rail as shown in FIGS. 6B and 7B, and allows the paperbacked film to pass through with an adequate gap. When, in this way, the aforementioned upper pressure plate 38 slides to the right and comes to the position indicated by solid lines in FIG. 1, the lever 18 moves to the position indicated by solid lines, and the frame-indicating lever 23 makes a move to the solid line position to indicate the number of frames A 10 that can be exposed. Both the intermediate lever 26 and the signal lever 25 are at solid line positions (within the locus of the cam 11) and stay on the upper surface of the frame counter gear 10. Then the idle winding is made by the lever 2 similar to the case of paper-backless film until the numeral 1 on the frame-indicating plate is visible through the window 1. FIG. 3C shows the state in which the first frame has been wound up. FIG. 3D shows the state in which the shutter button 31 has been depressed. When, in this way, the exposure is repeated until the final frame (No. 10 frame) and then the winding lever is operated, the cam 11 hits the end of the signal lever 25 and pushes the said lever out of the locus of the cam 11. Then the pin 25a of the said lever pushes the lever 27 toward the direction indicated by the arrow to release the engagement between the metering plates 12 and 13 and the engaging lever 27. Interlocking with this operation, the engagement between the ratchet pawl 29 and the ratchet 4 is also released. Therefore, the remaining paper portion can be completely taken up by the spool 6.

What is claimed is:

1. A roll film camera in which the film strip is guided in the exposure frame in a channel formed between a film guide surface on the camera body and a film guide plate, comprising
   a rotatable takeup spindle for winding the film strip passing through the film guide channel,
   a ratchet carried by said takeup spindle,
   a stop pawl for locking the movement of said takeup sprinkle by engaging therewith,
   a film-measuring roller positioned on the camera body to be engaged with the film strip and rotated by the movement of said film strip,
   indexing means including
      a counter shaft on the camera body rotated by said roller when a predetermined length of the film has been wound,
      an indexing disc carried by said counter shaft and having plurality of notches on the periphery thereof, and rockable lever interconnected to said stop pawl, and biased so as to engage in timed relation with the notch of said disc,
   means for moving automatically said rockable lever out of engaging relation with said indexing disc, including
      a segment cam carried by said counter shaft,
      and a movable lever engageable with said rockable lever and said segment cam when a predetermined length of the film has been wounded,
   and means operable to move said movable lever out of the path of the movement of said segment cam and to move said film guide plate for varying the inside width of said film guide channel selectively in conformity with the thickness of the film strip.

2. A roll film camera according to claim 1 further comprising
   a plate mounted on the camera back cover on which said film guide plate is slidably fixed,
   and a control knob rotatably mounted on said camera back cover for moving said film guide plate.

3. A roll film camera according to claim 1, wherein said indexing means has an exposure indication dial rotatable with said indexing disc, and an index lever having two indices on its end moved by said operable means, thereby said two indexes indicating the number of frames of the film strip in conformity with the thickness thereof.

4. A roll film camera according to claim 1, wherein said indexing disc is composed of a pair of plates,
   the first plate being fixed on said counter shaft and the second plate having larger periphery than said first plate and rotatably mounted on the latter so as to follow up by a half pitch of said notches,
   whereby when said notches of both plates coincide with each other by the winding operation, said stop pawl is engaged to said ratchet.